United States Patent
Andersen et al.

(10) Patent No.: US 9,513,932 B2
(45) Date of Patent: Dec. 6, 2016

(54) VIRTUAL TERMINAL DISPLAY FOR A VEHICLE

(71) Applicant: Deere & Company, Moline, IL (US)

(72) Inventors: Wayne A. Andersen, Johnston, IA (US); Michael J. Martin, Waterloo, IA (US); Steven R. Procuniar, Urbandale, IA (US); David C. Smart, Waterloo, IA (US); Michael A. Waldo, Ankeny, IA (US)

(73) Assignee: Deere & Company, Moline, IL (US)

( * ) Notice: Subject to any disclaimer, the term of this patent is extended or adjusted under 35 U.S.C. 154(b) by 522 days.

(21) Appl. No.: 13/922,580

(22) Filed: Jun. 20, 2013

(65) Prior Publication Data
US 2014/0325419 A1   Oct. 30, 2014

Related U.S. Application Data (60) Provisional application No. 61/817,572, filed on Apr. 30, 2013.

(51) Int. Cl.
G06F 3/048    (2013.01)
G06F 9/44     (2006.01)
B60K 35/00    (2006.01)

(52) U.S. Cl.
CPC ............ G06F 9/4445 (2013.01); B60K 35/00 (2013.01); *G06F 2212/173* (2013.01)

(58) Field of Classification Search
CPC .... B60R 16/023; H04L 67/12; H04L 12/4135; G06F 15/16; G06F 13/14; G06F 13/00; G06F 13/36; G06F 2212/173
See application file for complete search history.

(56) References Cited

U.S. PATENT DOCUMENTS

| | | | | |
|---|---|---|---|---|
| 6,009,354 A | * | 12/1999 | Flamme | A01B 79/005 172/4.5 |
| 6,167,337 A | * | 12/2000 | Haack | E02F 9/26 222/63 |
| 6,798,084 B1 | * | 9/2004 | Gobel | B60R 16/0315 307/10.1 |

(Continued)

OTHER PUBLICATIONS

P. Schicker and A. Duenki, "Virtual terminal definition and protocol," Oct. 1976, ACM SIGCOMM Computer Communication Review, vol. 6, Issue 4, pp. 1-18.*

(Continued)

*Primary Examiner* — Dino Kujundzic
(74) *Attorney, Agent, or Firm* — Brinks Gilson & Lione (57) ABSTRACT

A system and method for displaying data associated with an embedded system is provided that may include a vehicle data bus, an electronic control unit, and a display unit. The display unit may be configured to render a graphical user interface for the electronic control unit. Data may be exchanged between the electronic control unit and the display unit via the vehicle data bus in partial compliance with a virtual terminal protocol, where full compliance with the virtual terminal protocol requires that the graphical user interface rendered by the display unit be defined and controlled by the electronic control unit. Contrary to the requirement of full compliance with the virtual terminal protocol, the graphical user interface in the display unit may be defined and controlled by the display unit.

17 Claims, 8 Drawing Sheets

(56) References Cited

U.S. PATENT DOCUMENTS

| | | | |
|---|---|---|---|
| 7,515,998 B1 | 4/2009 | Stiffler | |
| 8,950,260 B2* | 2/2015 | Gelinske | G01F 1/666 73/1.16 |
| 9,330,062 B2* | 5/2016 | Thurow | G06F 17/00 |
| 2005/0085283 A1* | 4/2005 | Kormann | A01D 41/127 460/7 |
| 2005/0267655 A1 | 12/2005 | Gessner | |
| 2006/0241838 A1* | 10/2006 | Mongiardo | B60K 37/06 701/50 |
| 2006/0271348 A1 | 11/2006 | Rossow et al. | |
| 2007/0198144 A1 | 8/2007 | Norris et al. | |
| 2008/0215240 A1* | 9/2008 | Howard | G06F 3/0488 701/469 |
| 2010/0175014 A1* | 7/2010 | Obradovich | B60G 17/0195 715/771 |
| 2012/0265359 A1* | 10/2012 | Das | B60R 16/023 700/292 |
| 2012/0303177 A1* | 11/2012 | Jauch | G08C 17/02 701/1 |
| 2013/0211628 A1* | 8/2013 | Thurow | G06F 17/00 701/2 |

OTHER PUBLICATIONS

International Search Report and Written Opinion of the International Searching Authority issued in counterpart application No. PCT/US2014/35803, dated Sep. 18, 2014 (9 pages).

Snap-shot of the ISO 11783-11 online data base, downloaded Apr. 17, 2013 from http://dictionary.isobus.net/isobus/site/exports, pp. 1-243, International Organization for Standardization, Geneva, Switzerland.

International Organization for Standardization, International Standard ISO 11783-6, Second edition Oct. 15, 2010, Tractors and machinery for agriculture and forestry—Serial control and communications data network—Part 6: Virtual terminal, Cover pages pp. i-iv; 4.1 Overview, pp. 4-6; 4.5 Display areas, pp. 9-12; 4.6.1.1 General (Behaviour—Object Pools), p. 12; 4.6.4 Initialization, pp. 14-16; 4.6.7 Updating the operator interface, p. 21; Annex A, Table A.2, pp. 53-54; Annex C Object transport protocol, pp. 149-153; International Organization for Standardization, Geneva, Switzerland.

Qt (framework), downloaded Apr. 17, 2013, pp. 1-7, Wikipedia, the free encyclopedia, available at URL: en.wikipedia.org/wiki/Qt_(framework).

Telnet, downloaded Apr. 22, 2013, pp. 1-5, Wikipedia, the free encyclopedia, available at URL: en.wikipedia.org/wiki/Telnet.

X Window System, downloaded Apr. 17, 2013, Wikipedia, the free encyclopedia, available at URL: en.wikipedia.org/wiki/X_Window_System.

* cited by examiner

VIRTUAL TERMINAL DISPLAY FOR A VEHICLE

This application claims priority to U.S. Provisional Application No. 61/817,572 filed Apr. 30, 2013, the entire contents of which are incorporated by reference.

BACKGROUND

1. Technical Field

This application relates to embedded systems and, in particular, to display of data associated with embedded systems.

2. Related Art

Vehicles may include one or more embedded systems. An embedded system may include a computer system designed for one or more specific control functions of a system or sub-system. The computer system may be embedded as part of the system or sub-system. Examples of the system or subsystem include an engine, an air conditioner, a fertilizer spreader, a combine harvester, a crop sprayer, a tractor, any type of farm machinery, an automobile, any type of vehicle, or any other system, subsystem, or device. The embedded system may include data that is obtained from one or more sensors, is a status or a setting of a device, or is otherwise related to the embedded system.

SUMMARY

In one embodiment, a system for displaying data associated with an embedded system is provided that may include a vehicle data bus, an electronic control unit, and a display unit. The display unit may be configured to render a graphical user interface for the electronic control unit. The display unit may be in communication with the electronic control unit over the vehicle data bus. The electronic control unit may include a first virtual terminal service. The display unit may include a second virtual terminal service and a user interface applet. The second virtual terminal service may communicate, via the vehicle data bus, with the first virtual terminal service of the electronic control unit in partial compliance with a virtual terminal protocol, where full compliance with the virtual terminal protocol may include a requirement that the electronic control unit define and control the graphical user interface rendered by the display unit. Contrary to the requirement for full compliance with the virtual terminal protocol, a user interface applet of the display unit may define and control the graphical user interface. The user interface applet may also cause an exchange of data between the first and second virtual terminal services in partial compliance with the virtual terminal protocol.

In one embodiment, a computer-readable storage medium is provided for displaying data associated with an embedded system. The computer-readable storage medium may include instructions executable to store and maintain a data element in a memory of an electronic control unit. The computer-readable storage medium may further include instructions executable to transmit changes in the data element to a display unit over a vehicle data bus in partial compliance with a virtual terminal protocol, wherein the virtual terminal protocol is for remote definition and control of graphical user interfaces. The computer-readable storage medium may also include instructions executable to receive, over the vehicle data bus in partial compliance with the virtual terminal protocol, user updates to the data element made through a graphical user interface that is defined and controlled by the display unit instead of the electronic control unit, where full compliance with the virtual terminal protocol includes a requirement that the graphical user interface be defined and controlled by the electronic control unit.

In one embodiment, a method may be provided that displays data associated with an embedded system. An electronic control unit may be communicated with from a display unit via a vehicle data bus in partial compliance with a virtual terminal protocol, where full compliance with the virtual terminal protocol requires that a graphical user interface in the display unit be defined and controlled by the electronic control unit. A graphical user interface may be defined by the display unit contrary to the requirement of the virtual terminal protocol that the graphical user interface in the display unit be defined and controlled by the electronic control unit. The graphical user interface may be controlled by the display unit contrary to the requirement of the virtual terminal protocol that the graphical user interface in the display unit be defined and controlled by the electronic control unit.

Further objects and advantages of the present disclosure will be apparent from the following description, reference being made to the accompanying drawings.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
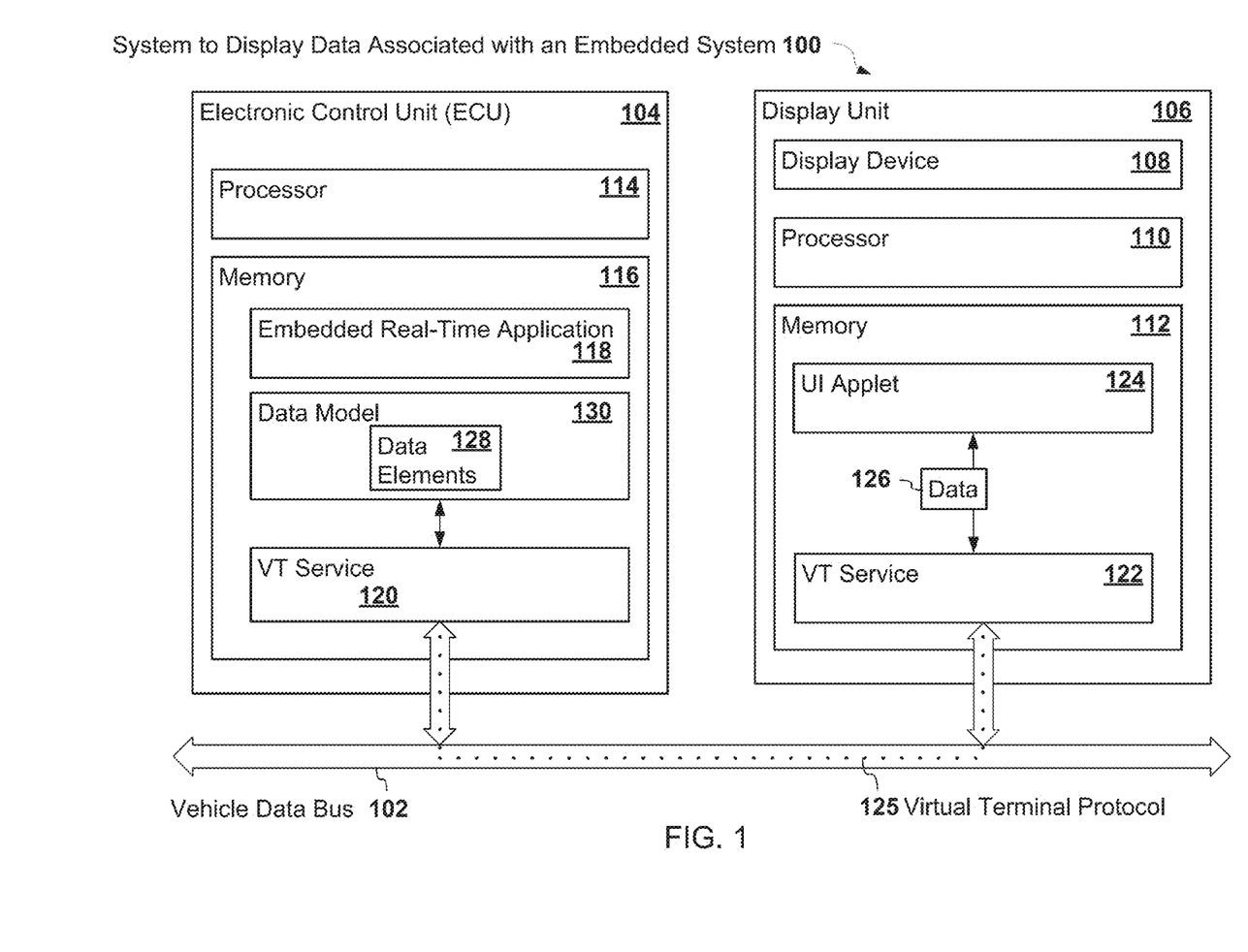
FIG. 1 illustrates a system to display data associated with an embedded system.

FIG. 1 illustrates a system 100 to display data associated with an embedded system. The system 100 may include a vehicle data bus 102, an electronic control unit 104, and a display unit 106.

The vehicle data bus 102 may be a communications network that interconnects components of a vehicle, such as an automobile, a bus, a train, an industrial vehicle, an agricultural vehicle, a ship, or an aircraft. Alternatively or in addition, the vehicle data bus 102 may be a communications network that interconnects components of an attachment to a vehicle, such as a trailer or a vehicle-hitchable device. In some examples, the vehicle data bus 102 may have specialized features for vehicle control, such as assurance of message delivery, assured non-conflicting messages, assured time of delivery, relative low cost, resilience in the presence of electromagnetic fields, redundant routing, and/or other characteristics. The vehicle data bus 102 may include a specialized communications network that provides such specialized features. The vehicle data bus 102 may be a communications network designed to facilitate microcontrollers and devices to communicate with each other without a host computer. Examples of the vehicle data bus 120 may include a controller area network (CAN) bus, a local interconnect network (LIN), an ISO 9141 compliant network, a J1850 compliant network, and an Ethernet network.

The electronic control unit 104 may be any embedded system that controls one or more electrical systems or subsystems in a vehicle or in an attachment to a vehicle. The electronic control unit (ECU) 104 may be hardware and/or a combination of hardware and software. Examples of the electronic control unit (ECU) 104 may include an Electronic/Engine Control Module (ECM), a Powertrain Control Module (PCM), a Transmission Control Module (TCM), a Brake Control Module (BCM or EBCM), a Central Control Module (CCM), a Central Timing Module (CTM), General Electronic Module (GEM), a Body Control Module (BCM), and a Suspension Control Module (SCM).

The display unit 106 may be any hardware or combination of hardware and software that renders images on a display device 108. Examples of the display unit 106 may include a computer, a monitor, a touchscreen device, a tablet computing device, a mobile device, a display controller, a digital signal processor, a video card, or any other device that renders images on the display device 108. The display unit 106 may include the display device 108, a processor 110 and a memory 112. Alternatively, the display unit 106 may be in communication with, but not include, the display device 108. For example, the display unit 106 may be electronically coupled to the display device 108 with or without cabling.

The memory 112 of the display unit 106 may be any device for storing and retrieving data or any combination thereof. The memory 112 may include non-volatile and/or volatile memory, such as a random access memory (RAM), a read-only memory (ROM), an erasable programmable read-only memory (EPROM), or a flash memory. Alternatively or in addition, the memory 112 may include an optical, magnetic (hard-drive), flash drive or any other form of data storage device.

The processor 110 may be any device that performs logic operations. The processor 110 of the display unit 106 may access data stored in the memory 112. The processor 110 may also be in communication with additional components, such as the display device 108 or a display controller (not shown) that is electrically coupled to and/or in communication with the display device 108. The processor 110 may include a general processor, a central processing unit, a graphics processing unit, an application specific integrated circuit (ASIC), a digital signal processor, a field programmable gate array (FPGA), a digital circuit, an analog circuit, a microcontroller, any other type of processor, or any combination thereof. The processor 110 may be any device that executes computer executable instructions or computer code embodied in the memory 112 or in other memory to perform features of the display unit 106.

The display device 108 may be any electro-optical device for displaying a graphical user interface. Examples of the display device 108 may include a liquid crystal display (LCD), an organic light-emitting diode (OLED) display, a cathode ray tube (CRT) display, an electro-luminescent display, a plasma display panel (PDP), a vacuum florescent display (VFD), or any other type of display device.

Like the display unit 106, the ECU 104 may include a processor 114 and a memory 116. The processor 114 of the ECU 104 may be any device that performs logic operations. For example, the processor 114 of the ECU 104 may be any component that executes computer executable instructions or computer code embodied in the memory 116 of the ECU 104 to perform features of the ECU 104. In some examples, the processor 114 of the ECU 104 may not have as much processing power as the processor 110 of the display unit 106. For example, the processor 114 of the ECU 104 may include a microcontroller, and the processor 110 of the display unit 106 may include multiple central processing units. In other examples, the processor 114 of the ECU 104 may have the same or greater processing power than the processor 110 of the display unit 106.

The memory 116 of the ECU 104 may include an embedded real-time application 118 and a virtual terminal service 120. The memory 112 of the display unit 106 may include a virtual terminal service 122 and a user interface applet 124.

The embedded real-time application 118 of the ECU 104 may be an application that includes logic for controlling and/or monitoring one or more electrical systems or subsystems. The user interface applet 124 of the display unit 106 may be an application that defines and controls a graphical user interface for the ECU 104. For example, the embedded real-time application 118 may include logic for controlling and/or monitoring a climate control system in a vehicle. Conversely, the user interface applet 124 of the display unit 106 may include logic that defines and controls a graphical user interface 200 for controlling and/or monitoring the climate control system. In other words, the embedded real-time application 118 of the ECU 104 may include controller logic, and the user interface applet 124 of the display unit 106 may include presentation logic.

Figure 2A:
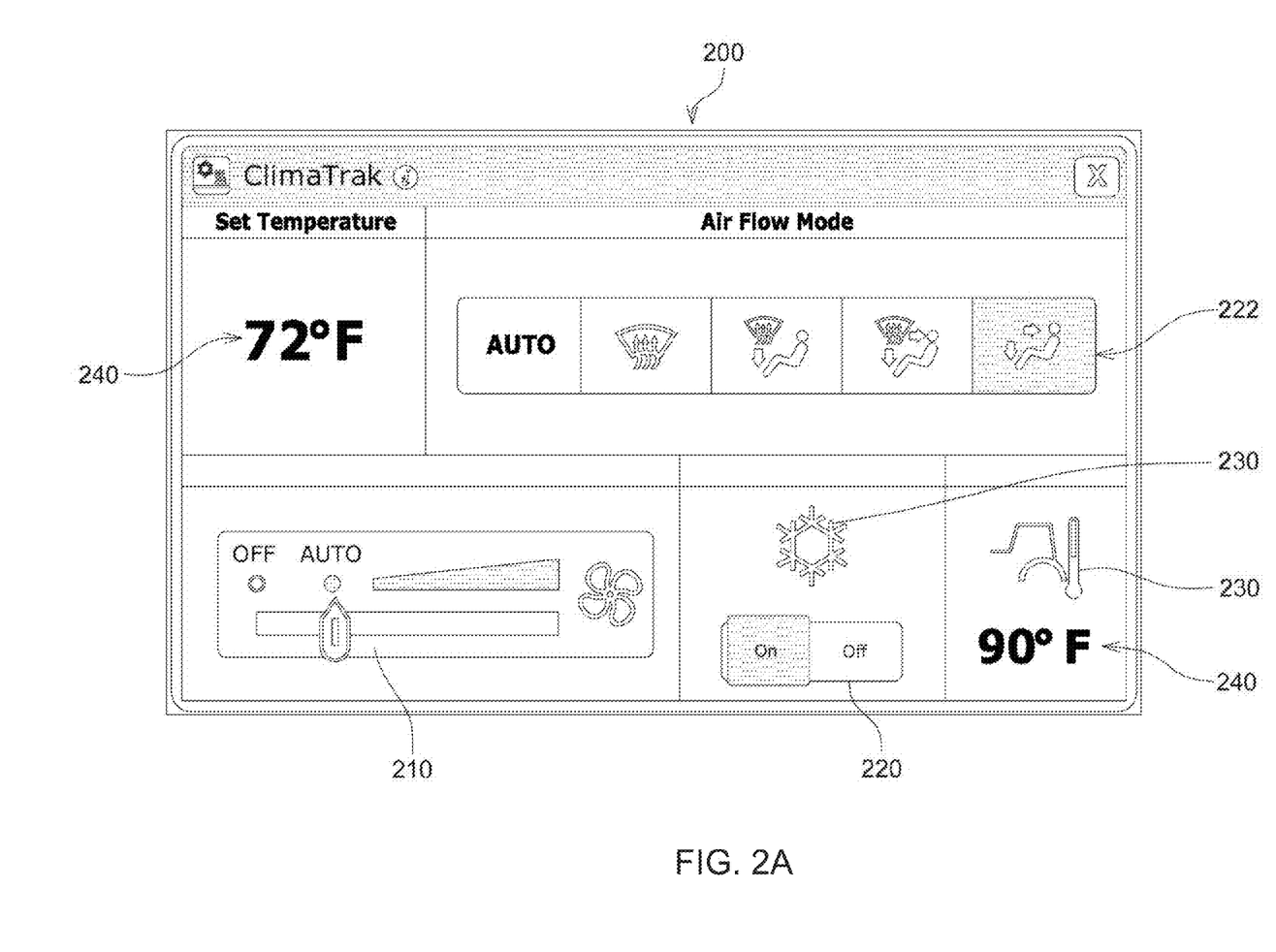
FIG. 2A illustrates a graphical user interface for a climate control system in a vehicle.
Figure 2B:
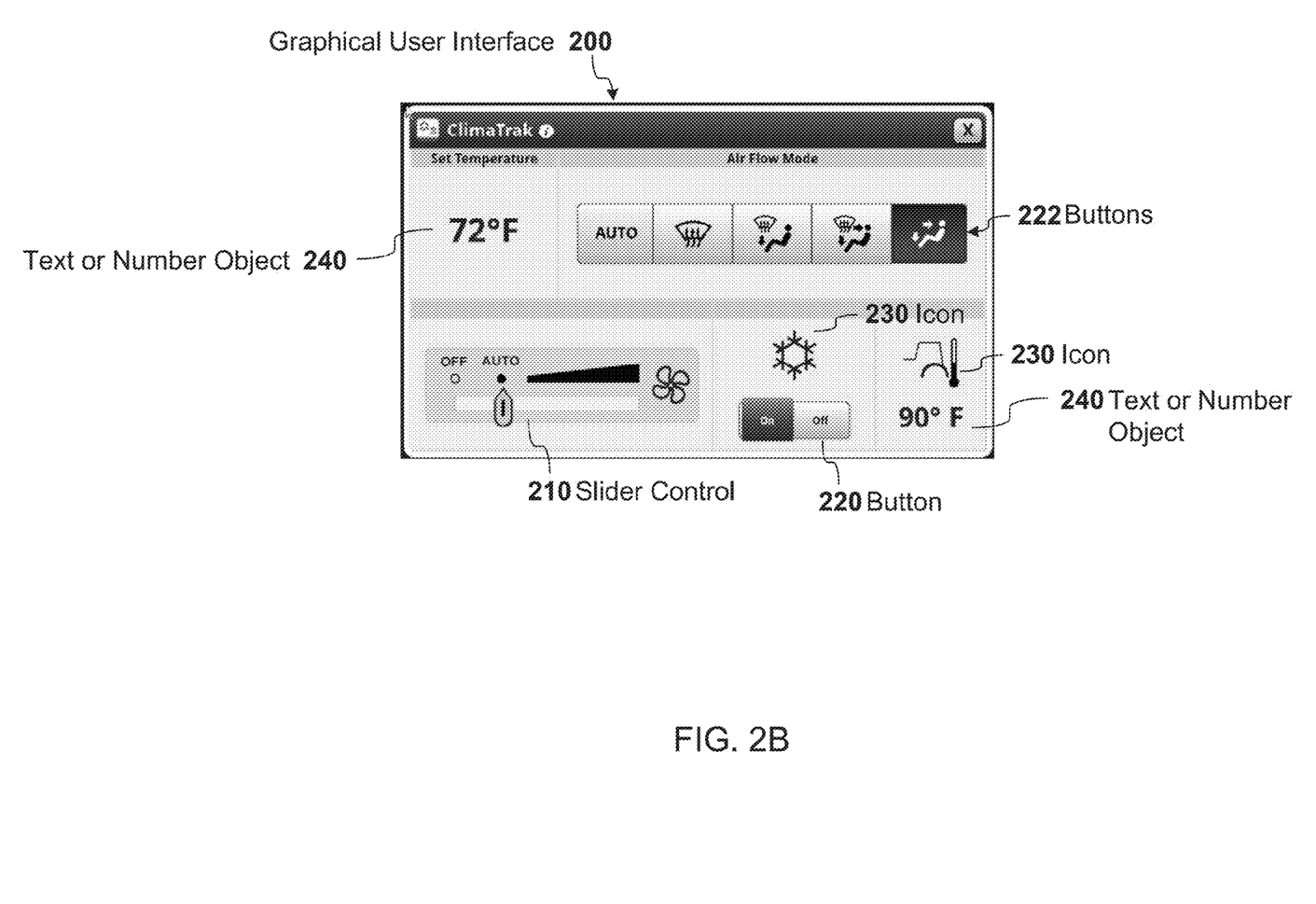
FIG. 2B illustrates a color graphical user interface for a climate control system in a vehicle.

FIG. 2A and FIG. 2B illustrate an example of the graphical user interface 200. The example is for controlling and/or monitoring a climate control system in a vehicle. The graphical user interface 200 (GUI) may be a type of user interface which enables users to interact with one or more electronic devices such as the ECU 104 via the display unit 106. The graphical user interface 200 may include user interface controls, such as a slider control 210 and buttons 220 and 222. The graphical user interface 200 may include other user interface elements, such as icons 230 and text or number objects 240. The graphical user interface 200 may offer the interface controls, 210 and 220, and visual indicators, such as the icons 230 and the text and/or number objects 240, as opposed to text-based interfaces, typed command labels or text navigation to represent the information and actions available to a user. The actions may be performed through direct manipulation of the graphical elements.

In some examples, the ECU 104 may include one or more electronic control devices that interact with the display unit 106 such that the graphical user interface 200 provides a single interface to a system or device controlled by the multiple electronic control devices included in the ECU 104. For example, a first of the electronic control devices may control the direction of air flow based on input received from the buttons 222 of the graphical user interface 200, while a second one of the electronic control devices may control other aspects of the climate control system based on input received from other controls of the graphical user interface 200.

Referring back to FIG. 1, the virtual terminal service 122 of the display unit 106 and the virtual terminal service 120 of the ECU 104 may each be a component that includes an implementation of a virtual terminal protocol 125 in the display unit 106 and in the ECU 104, respectively. The virtual terminal protocol 125 may be any communications protocol for remote definition and control of graphical user interfaces, such as virtual terminals. The virtual terminal protocol 125 may be any past, present, or future published standard, proprietary standard, or any other type of standard for establishing and controlling a virtual terminal.

In one example, the virtual terminal protocol 125 may be any version of ISO 11783-6 (International Organization for Standardization's standard entitled "Tractors and machinery for agriculture and forestry—Serial control and communications data network—Part 6: Virtual terminal"). In such an example, the virtual terminal service 120 of the ECU 104 may include an implementation of ISO 11783-6, and the virtual terminal service 122 of the display unit 106 may include an implementation of a client of the implementation of ISO 11783-6 that is included in the virtual terminal service 120 of the ECU 104. In a second example, the virtual terminal protocol 125 may be an X Window system protocol, such as X Version 11 or any other version of the X Window system protocol. In a third example, the virtual terminal protocol may be any version of ITU-T (International Telecommunications Union Telecommunications Standardization Sector standards for virtual terminal protocol). In a forth example, the virtual terminal protocol 125 may be an internet protocol that is based on any version of the Hypertext Transfer Protocol (HTTP). In such an example, the virtual terminal service 120 of the ECU 104 may operate as a web server, and the user interface applet 124 may operate as a browser.

The remote definition and control of graphical user interfaces described in the virtual terminal protocol 125 may include a requirement that a first device transmit to a second device a definition of user interface controls to be displayed in a graphical user interface at the second device. For example, ISO 11783-6 requires that an object pool be transmitted from a first device to a second device for full compliance with ISO 11783-6, where the second device is to host a virtual terminal for the first device, where the object pool describes each user interface control to be displayed in the virtual terminal.

However, in the system 100 to display data associated with the embedded system, the user interface applet 124 defines and controls the graphical user interface 100 in accordance with logic included in the user interface applet 124 instead of in accordance with the virtual terminal protocol 125. For example, the user interface applet 124 may read a definition of the graphical user interface 100 from a file on the display unit 106, handle any events generated by a user interacting with the user interface 200. Nevertheless, the virtual terminal services 120 and 122 may communicate data 126 between the ECU 104 and the display unit 106, via the vehicle data bus 102, in accordance with the virtual terminal protocol 125. Accordingly, the virtual terminal services 120 and 122 may communicate data 126 between the ECU 104 and the display unit 106 in partial compliance with the virtual terminal protocol 125.

Figure 3:
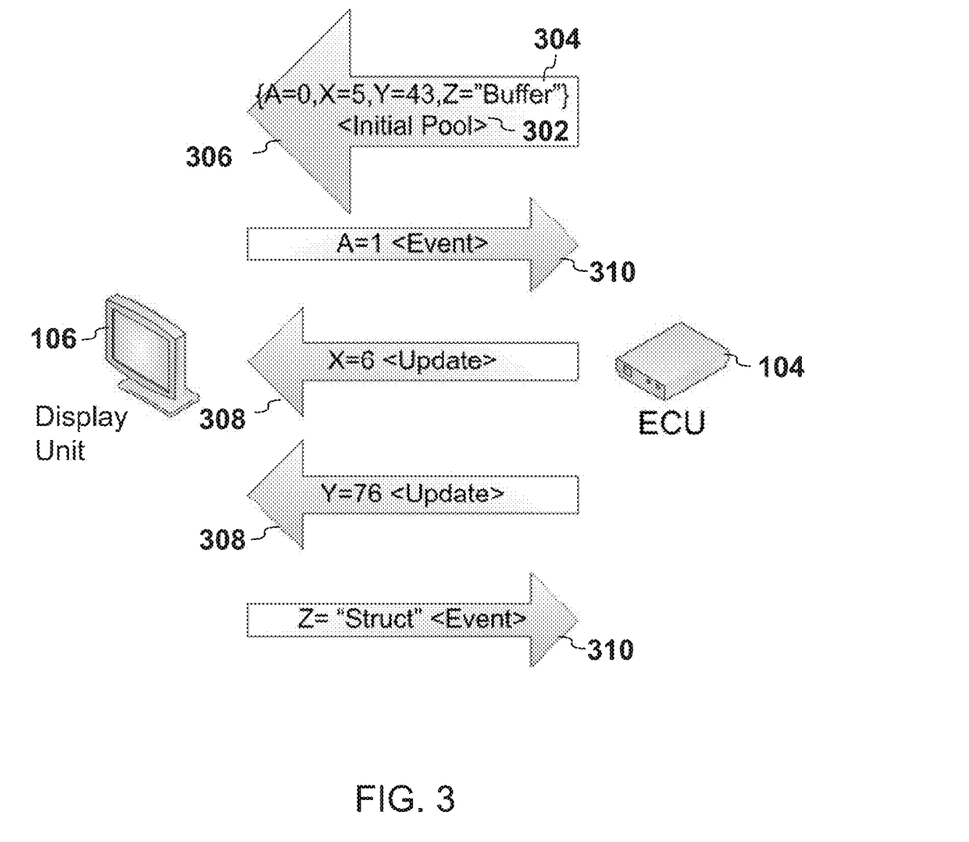
FIG. 3 illustrates data being communicated between an electronic control unit and a display component in accordance with a virtual terminal protocol.

FIG. 3 illustrates an example of the data 126 being communicated between the virtual terminal service 120 of the ECU 104 and the virtual terminal service 122 of the display unit 106 in accordance with the virtual terminal protocol 125, but not in full compliance with the virtual terminal protocol 125. In the example illustrated in FIG. 3, the virtual terminal protocol 125 is the ISO 11783-6 standard.

According to the ISO 11783-6 standard, the ECU 104 is required to transmit an initial pool 302 at initialization time. In addition, the initial pool 302 is to include user interface objects that represent all user interface controls to be displayed in a virtual terminal. Each one of the user interface objects has attributes, such as a relative location of the respective user interface object on the virtual terminal. The initial pool 302 may optionally include variable objects used to share data between two or more of the user interface objects. A change in one of the variable objects will be reflected in the user interface objects that share the variable object. Use of the variable objects may limit network traffic on the vehicle data bus 102 because only the change in the one variable object needs to be communicated instead of communicating a change to all the user interface objects that share the variable object.

Contrary to the requirements of the ISO 11783-6 standard, the system 100 to display data associated with the embedded system may not include any user interface objects in the initial pool 302 transmitted by the virtual terminal service 120 of the ECU 104 to the display unit 106. Instead, the initial pool 302 may describe data elements 128 stored in the memory 116 of the ECU 104. The data elements 128 may be represented as variable objects 304 in the initial pool 302. Each of the data elements 128 may include a name or other type of identifier of the data element 128 and a corresponding value of the data element 128. The data elements 128 may include sensor data, mode indicators, status indicators, control values or any other type of value obtained, generated, and/or used by the ECU 104. For example, the data elements 128 may correspond to a temperature inside a vehicle, a temperature outside a vehicle, a fan speed setting, a target temperature inside of a vehicle, a flow rate, a text value of a text input field, or any other value. The VT service 102 and/or the embedded real-time application 118 may store and maintain the data elements 128 in a data model 130 in the memory 116 of the ECU 104. The data model 130 may be any type of database or data structure with which data may be stored and retrieved.

During operation of the system 100, the virtual terminal service 120 of the ECU 104 may transmit (306) the initial pool 302 to the virtual terminal service 122 of the display unit 106. The initial pool 302 may include an indication that the user interface applet 124 is to define and control the graphical user interface 200 contrary to requirements of the virtual terminal protocol 125. The indication included in the initial pool 302 may be a predefined variable object, a predefined user interface object that is not ultimately displayed in the graphical user interface 200, or any other structure that indicates that the user interface applet 124 and/or the display unit 106 is to define and control the graphical user interface 200. Alternatively, the user interface applet 124 may not receive any such indication. Instead, the user interface applet 124 may simply operate under an assumption that the user interface applet 124 is to define and control the graphical user interface 200. Alternatively or in addition, the user interface applet 124 and/or the display unit 106 may transmit an indication to the electronic control unit 104 that the user interface applet 124 is to define and control the graphical user interface 200.

During further operation of the system 100, the embedded real-time application 118 may update values in the data elements 128. For example, the embedded real-time application 118 may update values of the data elements 128 in the data model 130 that include sensor readings. The virtual terminal service 120 of the ECU 104 may transmit (308) the data 126 indicating the new values to the affected data elements 128 to the virtual terminal service 122 of the display unit 106. The user interface applet 124 may receive the data 126 via the virtual terminal service 122. The user interface applet 124 may update the graphical user interface 200 to reflect the new values of the affected data elements 128.

Conversely, the user interface applet 124 may receive input from a user via the graphical user interface 200. For example, the user may update text in a text field, change a position of a slider in the slider control 210, or press one or more of the buttons 220 and 222. The user interface applet 124 may determine that the input from the user changes a value of one or more of the data elements 128. In response to such a determination, the user interface applet 124 may transmit (310) an indication of the change in a value of one or more of the data elements 128 via the virtual terminal service 122 to the virtual terminal service 120 of the ECU 104. The virtual terminal service 120 of the ECU 104 may update the data model 130 and/or notify the embedded real-time application 118 of the change.

Figure 4:
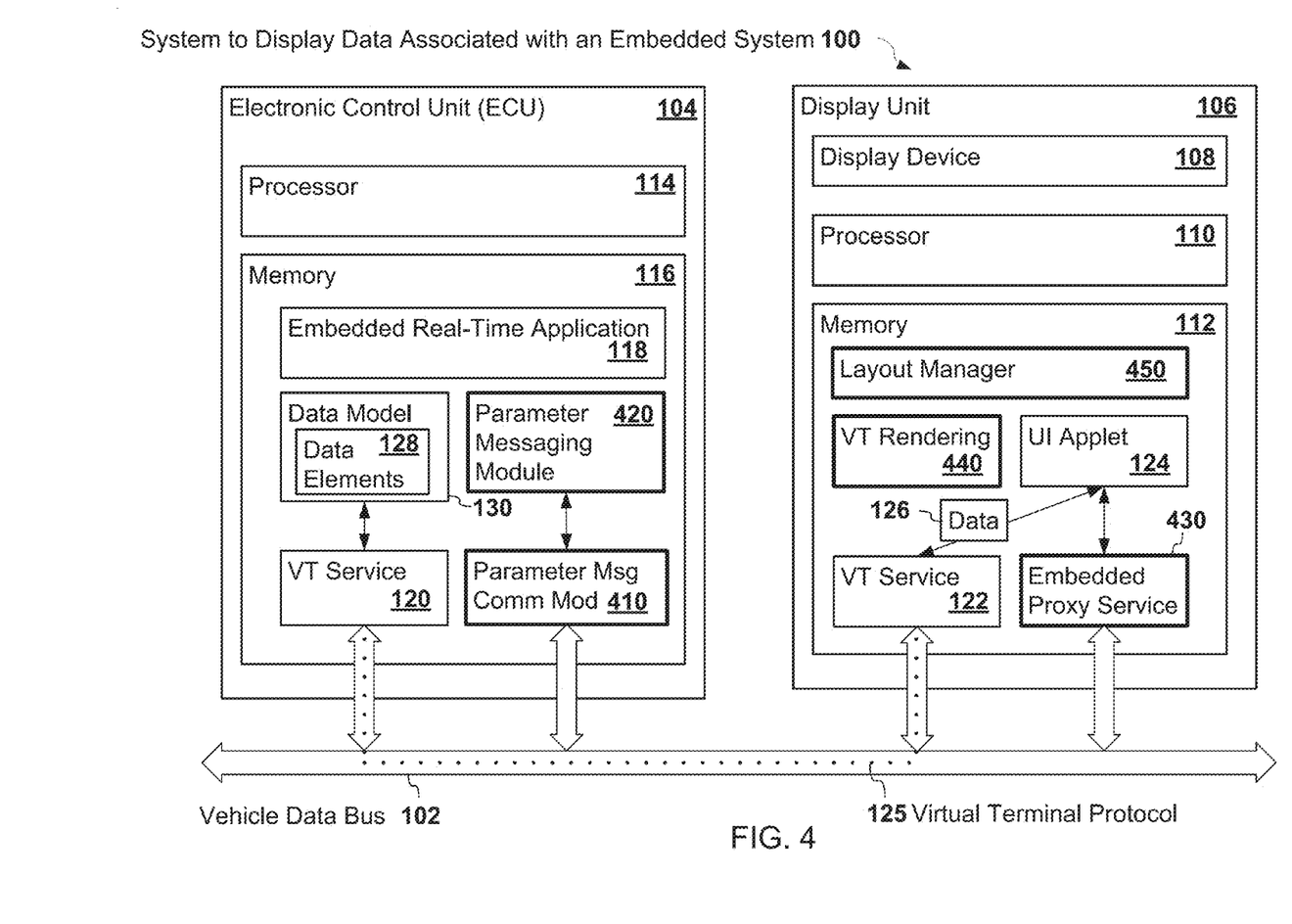
FIG. 4 illustrates an alternative system to display data associated with an embedded system.

The system 100 may be implemented with additional, different, or fewer components than illustrated in FIG. 1. FIG. 4 illustrates an example of the system 100 that includes additional components not illustrated in FIG. 1. For example, the system 100 may include one or more components for communication that is not based on the virtual terminal protocol 125, such as a parameter messaging communication module 410 and a parameter messaging module 420 in the ECU 104, and an embedded proxy service 430 in the display unit 106. Alternatively or in addition, the system 100 may include one or more components related to graphical user interface generation, such as a virtual terminal rendering module 440 and a layout manager 450. In still other examples, the system 100 may include one or more additional user interface devices, such as a touch screen, a mouse, a keyboard, a key pad, a trackball, a stylus, or any other type of device with which information may be transmitted to the display unit 106 by a user.

With respect to the ECU 104, the parameter messaging communication module 410 may be a module that sends and/or receives messages over the vehicle data bus 102. For example, the parameter messaging module 410 in the ECU 104 may be an implementation of ISO/DIS 11783-7 (International Organization for Standardization's standard entitled "Tractors and machinery for agriculture and forestry—Serial control and communications data network—Part 7: Implement messages application layer"). The parameter messaging module 420 in the ECU 104 may handle sending and receiving messages via the parameter messaging communication module 410 on behalf of the embedded real-time application 118.

With respect to the display unit 106, the embedded proxy service 430 may provide an application programming interface (API) through which the user interface applet 124 may send and/or receive messages to the embedded real-time application 118 over the vehicle data bus 102. The embedded proxy service 430 may send messages to and/or receive messages from the embedded real-time application 118 through the parameter messaging communication module 410. Alternatively or in addition, the embedded proxy service 430 may send the data 126 to and/or receive the data 126 from the embedded real-time application 118 through the virtual terminal service 122. The embedded proxy service 430 may provide an API to the user interface applet 124 with which the user interface applet 124 may communicate with the embedded real-time application 118, where the embedded proxy service 430 selects an appropriate protocol to perform the communication.

The user interface applet 124 may use components such as the layout manager 450 to generate the graphical user interface 200. The layout manager 450 may provide an API to applications, such as the user interface applet 124, for creating windows, dialog boxes, the user interface controls 210 and 220, and/or other items in the graphical user interface 200. The layout manager 450 may also generate events in response to a user interacting with the graphical user interface 200 and provide the events to the application controlling the graphical user interface 200.

The virtual terminal rendering module 440 may be a module that generates a graphical user interface in accordance with the virtual terminal protocol 125. In some examples in which the display unit 106 includes the virtual terminal rendering module 440, the virtual terminal rendering module 440 may be inactive because the user interface applet 124 generates the graphical user interface 200. In other examples, the virtual terminal rendering module 440 may optionally render a graphical user interface when the embedded real-time application 118 indicates to the display unit 106 that the graphical user interface is to be designed and controlled in accordance with the virtual terminal protocol.

Each component of the system 100 may include additional, different, or fewer components. For example, the display unit 106 may include an application framework, such as Qt framework, Ruby on Rails, or Grails, which may simplify the development of graphical user interface applications. The application framework may include features such as customizable widgets, customizable navigation, and/or support for cross-platform development. The user interface applet 124 may be developed based on the application framework. The user interface applet 124 may be any type of application or applet.

In one example, the ECU 104 may transmit the user interface applet 124 via the vehicle data bus 102 based on the virtual terminal protocol 125 or some other protocol. The ECU 104 may transmit the user interface applet 124 to the display unit 106 when the display unit 106 and the ECU 104 first connect or at some other time.

The system 100 may be implemented in many different ways. Each module, such as the embedded real-time application 118, the virtual terminal services 120 and 122, and the user interface applet 124, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 112, for example, that comprises instructions executable with the processor 110 or other processor to implement one or more of the features of the module. When any one of the module includes the portion of the memory that comprises instructions executable with the processor, the module may or may not include the processor. In some examples, each module may just be the portion of the memory 112 or other physical memory that comprises instructions executable with the processor 110 or other processor to implement the features of the corresponding module without the module including any other hardware. Because each module includes at least some hardware even when the included hardware comprises software, each module may be interchangeably referred to as a hardware module, such as the virtual terminal service hardware module, the user interface applet hardware module, and the embedded real-time application hardware module.

Although some features are shown stored in computer-readable memories (e.g., as logic implemented as computer-executable instructions or as data structures in memory), all or part of the system and its logic and data structures may be stored on, distributed across, or read from other types of machine-readable storage media. The computer-readable storage media may include memories, hard disks, floppy disks, CD-ROMs, or any other type of storage medium or storage media.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs, modules, or circuitry, may be combined or split among multiple programs, distributed across several memories and processors, and may be implemented in a library, such as a shared library (e.g., a dynamic link library (DLL)).

Although the disclosure refers to vehicles, the system 100 to display data associated with an embedded system may be for an embedded system that is unrelated to vehicles. For example, the embedded system may be a medical device system. Accordingly, references to the electronic control unit 104 may refer to an embedded system generally, and references to the vehicle data bus 102 may refer more generally to any type of communication bus or network.

Figure 5:
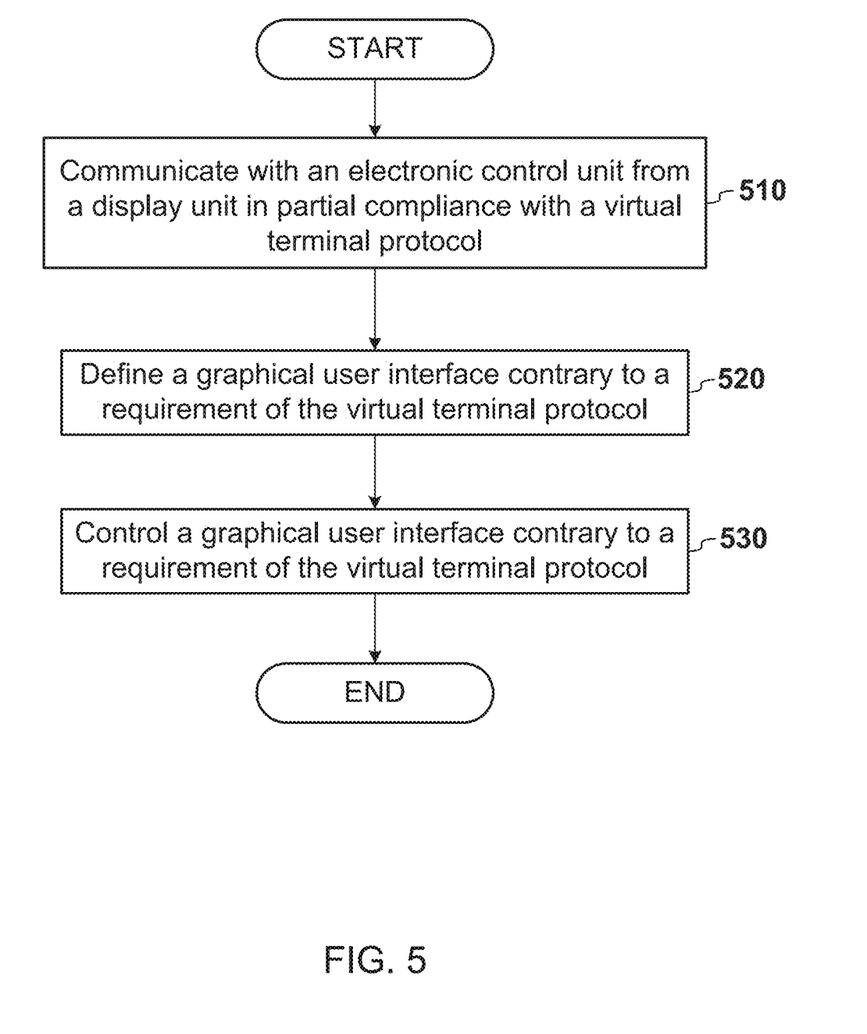
FIG. 5 illustrates a flow diagram of the logic of a system to display data associated with an embedded system.

FIG. 5 illustrates a flow diagram of an example of the logic of the system 100. The logic may include additional, different, or fewer operations. The operations may be executed in a different order than illustrated in FIG. 5.

The display unit 106 may communicate (510) with the electronic control unit 104 via the vehicle data bus 102 in partial compliance with the virtual terminal protocol 125, where full compliance with the virtual terminal protocol 125 requires that the graphical user interface 200 rendered by the display unit 106 be defined and controlled by the electronic control unit 104.

The graphical user interface 200 may be defined (520) in accordance with logic included in the display unit 106 contrary to the requirement of the virtual terminal protocol 125 that the graphical user interface 200 be defined and controlled by the electronic control unit 104.

The graphical user interface 200 may be controlled (530) in accordance with logic included in the display unit 106 contrary to the requirement of the virtual terminal protocol 125 that the graphical user interface 200 be defined and controlled by the electronic control unit 104

Figure 6:
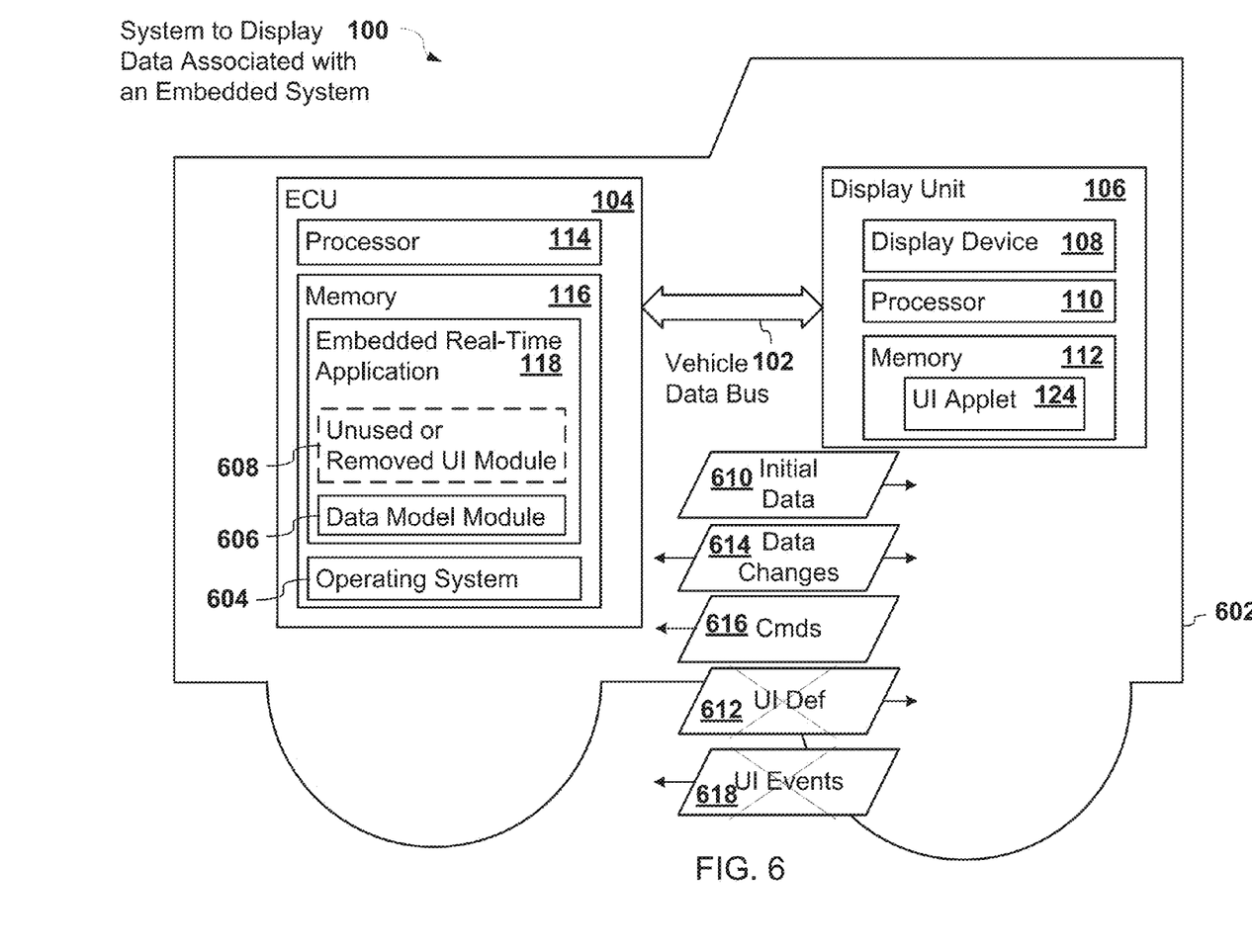
FIG. 6 illustrates a system in a vehicle to display data.

FIG. 6 illustrates an example of the system 100 in a vehicle 602. The ECU 104 may include the processor 114 and the memory 116. The memory may include the embedded real-time application 118 and an operating system 604 in which the embedded real-time application 118 executes. The operating system 604 may implement one or more communication features of the virtual terminal protocol 125.

The embedded real-time application 118 may include a data module 606 that updates and interprets the data elements 128 of the data model 130. In some examples, the embedded real-time application 118 may include a user interface module 608 that is configured to define and control the graphical user interface 200. The user interface module 608 of the embedded real-time application 118 may be unused and/or information transmitted by the user interface module 608 over the vehicle data bus 102 may be ignored by the display unit 106. Alternatively, the embedded real-time application 118 may not include the user interface module 608. In some examples, a first version of the embedded real-time application 118 that includes the user interface module 608 may be replaced by a second version of the embedded real-time application 118 that does not include the user interface module 608.

During operation of the system 100, the embedded real-time application 118 may transmit initial data 610 to the display unit 106 over the vehicle data bus 102. The initial data 610 may identify the data elements 128 in the data model 130 stored in the ECU 104. Although the virtual terminal protocol 125 may require that the initial data 610 include a definition 612 of the graphical user interface 200 or the user interface controls 210, 220, and 222, the initial data 610 may be transmitted without such information.

As the data elements 128 are changed by the ECU 104 or changes to the data elements 128 are made by the display unit 106, indications 614 of the data changes may be exchanged between the ECU 104 and the display unit 106 via the vehicle data bus 102 in accordance with the virtual terminal protocol 125.

The display unit 106 may transmit commands 616 that control the ECU 104. For example, in response to the button 220 being pressed via the graphical user interface 200, the user interface applet 124 may send a command to the ECU 104 to turn on an air conditioner. Although the commands 616 may be transmitted by the display unit 106 in response to user interface events, such as in response to a button pressed event indicating that the button 200 was pressed, the user interface events are handled by the user interface applet 124. Accordingly, the display unit 106 may avoid transmitting user interface events 618 to the ECU 104.

Network traffic on the vehicle data bus 102 may be reduced by not transmitting the user interface events 618 and/or the definition 612 of the graphical user interface 200 or the user interface controls 210, 220, and 222. The reduced network traffic may effectively increase available bandwidth in the vehicle data bus 102. Accordingly, the system 100 may improve responsiveness, bandwidth or capacity for vehicle control or status monitoring, such as engine control, guidance of the vehicle 602 via a global position system (GPS), or any other purpose.

Responsiveness of the graphical user interface 200 generated by the display unit 106 may be decoupled from or independent of the ECU 104. For example, if the processing power of the ECU 104 is limited, non-use or removal of the user interface module 608 from the ECU 104 may increase available performance capacity of the ECU 104 and limit any effect the processing power of the ECU 104 may have on the responsiveness of the graphical user interface 200.

Figure 7:
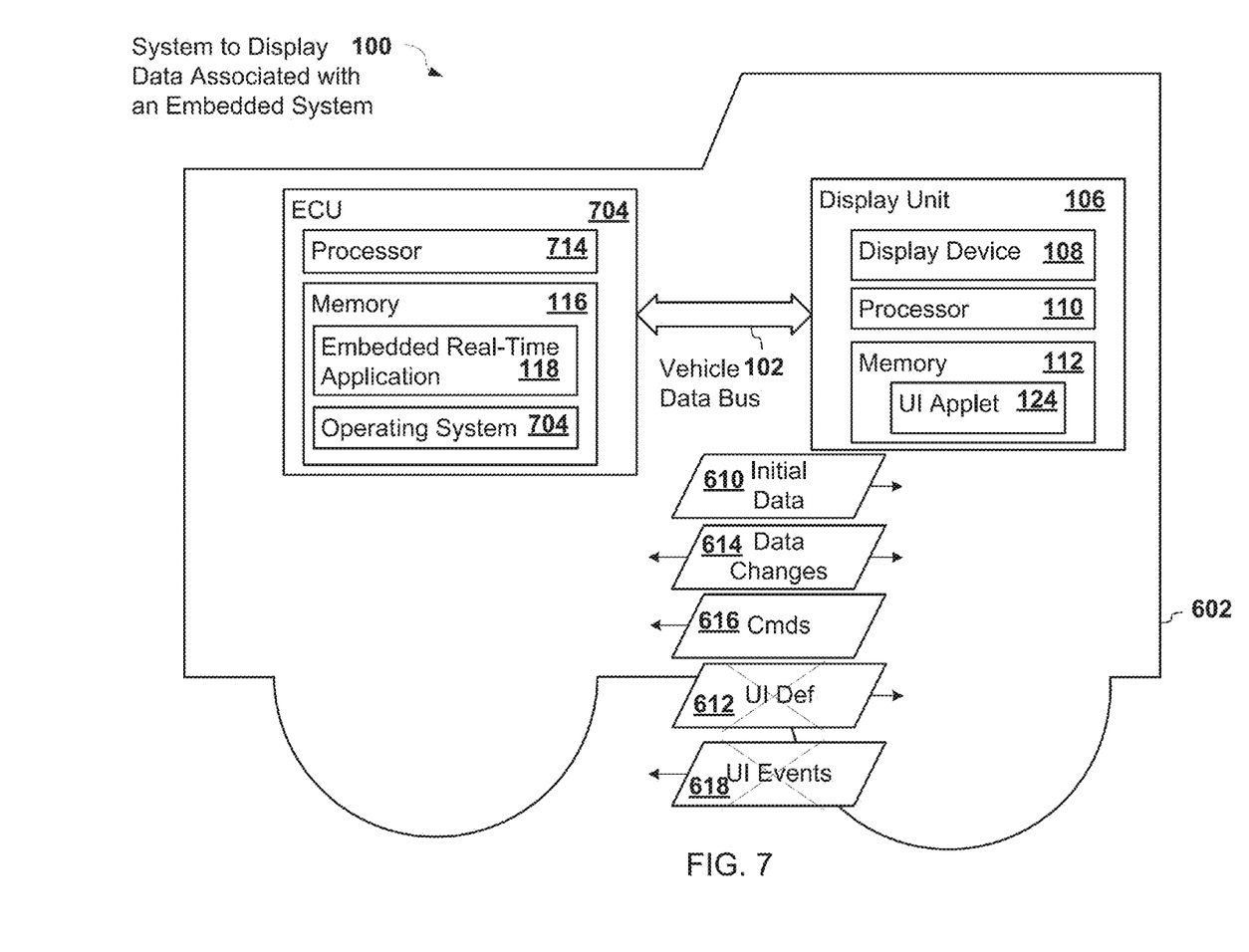
FIG. 7 illustrates a system to display data that includes an electronic control unit, which is different than an electronic control unit illustrated in FIG. 6.

FIG. 7 illustrates the system 100 to display data that includes an electronic control unit (ECU) 704 that is different than the electronic control unit 104 illustrated in FIG. 6. For example, the ECU 704 illustrated in FIG. 7 may have a different manufacturer than the ECU 104 illustrated in FIG. 6. Alternatively or in addition, the ECU 704 illustrated in FIG. 7 may include a processor 714 that is different than the processor 104 of the ECU 104 illustrated in FIG. 6. For example, the processor 714 may have a different processing capacity or a different number of processors. Alternatively or in addition, the ECU 704 illustrated in FIG. 7 may include different software than the ECU 104 illustrated in FIG. 6.

For example, the ECU 704 may include an operating system 704 that is different than the operating system 604 included in the ECU 104 illustrated in FIG. 6.

Accordingly, the display unit 106 illustrated in FIG. 6 and FIG. 7 may generate the graphical user interface 200 that is independent of the processing capabilities, the manufacturer, and the software included in the ECU 104 or 704. The richness and responsiveness of the graphical user interface 200 may not be limited by the processing capabilities of the ECU 104 or 704. In addition, the richness and responsiveness of the graphical user interface 200 may be independent of the type of the vehicle 602 that includes the ECU 104 or 704.

All of the discussion, regardless of the particular implementation described, is exemplary in nature, rather than limiting. For example, although selected aspects, features, or components of the implementations are depicted as being stored in memories, all or part of systems and methods consistent with the innovations may be stored on, distributed across, or read from other computer-readable storage media, for example, secondary storage devices such as hard disks, floppy disks, and CD-ROMs; or other forms of ROM or RAM. The computer-readable storage media may be non-transitory computer-readable media, which includes CD-ROMs, volatile or non-volatile memory such as ROM and RAM, or any other suitable storage device. Moreover, the various modules and screen display functionality is but one example of such functionality and any other configurations encompassing similar functionality are possible.

The respective logic, software or instructions for implementing the processes, methods and/or techniques discussed above may be provided on computer-readable media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein may be executed in response to one or more sets of logic or instructions stored in or on computer readable media. The functions, acts or tasks are independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

Furthermore, although specific components are described above, methods, systems, and articles of manufacture consistent with the innovation may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

To clarify the use of and to hereby provide notice to the public, the phrases "at least one of <A>, <B>, ... and <N>" or "at least one of <A>, <B>, ... <N>, or combinations thereof" or "<A>, <B>, ... and/or <N>" are defined by the Applicant in the broadest sense, superseding any other implied definitions hereinbefore or hereinafter unless expressly asserted by the Applicant to the contrary, to mean one or more elements selected from the group comprising A, B, ... and N. In other words, the phrases mean any combination of one or more of the elements A, B, ... or N including any one element alone or the one element in combination with one or more of the other elements which may also include, in combination, additional elements not listed.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

What is claimed is:

1. A system for displaying data associated with an embedded system, the system comprising:

a vehicle data bus;

an electronic control unit comprising a first virtual terminal service; and a display unit configured to render a graphical user interface for the electronic control unit, the display unit in communication with the electronic control unit over the vehicle data bus, the display unit comprising:

a processor; and a memory comprising:

a second virtual terminal service executable by the processor to communicate, via the vehicle data bus, with the first virtual terminal service of the electronic control unit according to a virtual terminal protocol, wherein the first virtual terminal service of the electronic control unit is configured to communicate with the second virtual terminal service in full compliance with the virtual terminal protocol, wherein full compliance with the virtual terminal protocol includes a requirement that the electronic control unit define and control the graphical user interface rendered by the display unit, and the requirement that the electronic control unit define and control the graphical user interface includes a requirement that the electronic control unit transmit, to the display unit, a definition of each user interface control that the display unit is to render for the electronic control unit; and a user interface applet executable by the processor, contrary to full compliance with the virtual terminal protocol, to define and control the graphical user interface including to define user interface controls that are rendered by the display unit in accordance with logic included in the user interface applet instead of the definition of each user interface control received from the electronic control unit, wherein the user interface applet is further executable to cause an exchange of data between the first virtual terminal service and the second virtual terminal service in compliance with the virtual terminal protocol.

2. The system of claim 1, wherein a value displayed in a user interface control of the graphical user interface is transmitted from the first virtual terminal service of the electronic control unit to the second terminal service of the display unit in compliance with the virtual terminal protocol.

3. The system of claim 1, wherein the virtual terminal protocol includes ISO 11783-6.

4. The system of claim 1, wherein the first virtual terminal service of the electronic control unit transmits an indication to the second virtual terminal service of the display unit that the display unit is to define and control the graphical user interface for the electronic control unit instead of the electronic control unit.

5. The system of claim 4, wherein the indication that the display unit is to define and control the graphical user interface for the electronic control unit is transmitted in an object pool that the virtual terminal protocol describes as including user interface controls included in a remote graphical user interface.

6. A non-transitory computer-readable storage medium comprising instructions executable by a processor, the instructions comprising:
   instructions executable to store and maintain a data element in a memory of an electronic control unit;
   instructions executable to transmit changes in the data element to a display unit over a vehicle data bus in full compliance with a virtual terminal protocol, wherein the virtual terminal protocol is for remote definition and control of graphical user interfaces, wherein full compliance with the virtual terminal protocol includes a requirement that the electronic control unit define and control the graphical user interface rendered by the display unit, and wherein the requirement that the electronic control unit define and control the graphical user interface includes a requirement that the electronic control unit transmit, to the display unit, a definition of each user interface control that the display unit is to render for the electronic control unit; and
   instructions executable to receive, over the vehicle data bus in compliance with the virtual terminal protocol, user updates to the data element made through a graphical user interface that is, contrary to full compliance with the virtual terminal, defined and controlled by logic in the display unit instead of the definition of each user interface control received by the display unit from the electronic control unit.

7. The computer-readable storage medium of claim 6 further comprising instructions to transmit the definition of each user interface control that the display unit is to render for the electronic control unit to the display unit over the vehicle data bus.

8. The computer-readable storage medium of claim 6, wherein contrary to the requirement that the electronic control unit transmit, to the display unit, the definition of each user interface control that the display unit is to render for the electronic control unit, the definition of each user interface control that the display unit is to render for the electronic control unit is not transmitted by the electronic control unit to the display unit.

9. The computer-readable storage medium of claim 6 further comprising instructions executable to transmit an object pool from the electronic control unit to the display unit, the object pool transmitted without the object pool comprising a definition of a user interface control of the graphical user interface, wherein the virtual terminal protocol requires that the transmitted object pool comprise a definition of the user interface control of the graphical user interface.

10. The computer-readable storage medium of claim 6 further comprising instructions executable to transmit an object pool from the electronic control unit to the display unit, the object pool comprising an indication that the display unit, not the electronic control unit, define and control the graphical user interface, wherein the virtual terminal protocol indicates that the object pool is to comprise a definition of the graphical user interface.

11. The computer-readable storage medium of claim 6, wherein the data element comprises a control value on which a behavior of the electronic control unit is based.

12. The computer-readable storage medium of claim 6, wherein the data element comprises sensor data received by the electronic control unit.

13. A method to display data associated with an embedded system, the method comprising:
   communicating with an electronic control unit from a display unit via a vehicle data bus in compliance with a virtual terminal protocol, wherein full compliance with the virtual terminal protocol requires includes a requirement that the electronic control unit transmit, to the display unit, a definition of each user interface control that the display unit is to render for the electronic control unit;
   defining a graphical user interface, contrary to full compliance with the virtual terminal protocol, in accordance with logic included in the display unit instead of in accordance with the definition of each user interface control received by the display unit from the electronic control unit, wherein defining the graphical user interface includes specifying a definition of each user interface control that the display unit is to render; and
   controlling the graphical user interface in accordance with logic included in the display unit contrary to the requirement of the virtual terminal protocol that the graphical user interface rendered by the display unit be defined and controlled by the electronic control unit.

14. The method of claim 13, wherein communicating with the electronic control unit includes transmitting an indication that a user changed a data element from the display unit to the electronic control unit.

15. The method of claim 13, wherein communicating with the electronic control unit includes receiving an indication at the display unit that a data element stored in the electronic control unit changed.

16. The method of claim 13, wherein communicating with the electronic control unit includes transmitting an indication to the electronic control unit that the display unit is to define and control the graphical user interface in accordance with logic included in the display unit.

17. The method of claim 13, wherein communicating with the electronic control unit includes receiving an indication from the electronic control unit that the display unit is to define and control the graphical user interface in accordance with logic included in the display unit.

* * * * *